United States Patent
Shoji

[19]

[11] Patent Number: 6,062,117
[45] Date of Patent: May 16, 2000

[54] MACHINING APPARATUS FOR WORKS HAVING NON-CIRCULAR CURVES

[75] Inventor: Masahiro Shoji, Ishikawa, Japan

[73] Assignee: Komatsu Machinery Corp., Ishikawa-ken, Japan

[21] Appl. No.: 09/214,469

[22] PCT Filed: Sep. 19, 1997

[86] PCT No.: PCT/JP97/03344

§ 371 Date: Jan. 21, 1999

§ 102(e) Date: Jan. 21, 1999

[87] PCT Pub. No.: WO98/12009

PCT Pub. Date: Mar. 26, 1998

[30] Foreign Application Priority Data

Sep. 20, 1996 [JP] Japan ..................................... 8-249572
May 16, 1997 [JP] Japan ..................................... 9-126835

[51] Int. Cl.[7] ............................................................. B23C 5/24
[52] U.S. Cl. ............................... 82/122; 82/129; 82/132; 82/137
[58] Field of Search ................................ 82/18, 11, 122, 82/129, 132, 137, 118

[56] References Cited

U.S. PATENT DOCUMENTS

| | | | |
|---|---|---|---|
| Re. 34,155 | 1/1993 | Link ............................................. | 82/18 |
| 3,735,651 | 5/1973 | Hartford ....................................... | 82/11 |
| 3,783,718 | 1/1974 | Kuhne et al. ................................. | 82/11 |
| 3,916,737 | 11/1975 | Libicki ......................................... | 82/11 |
| 4,250,779 | 2/1981 | Feller et al. ................................. | 82/18 |
| 4,343,206 | 8/1982 | Douglass et al. ............................ | 82/11 |
| 4,590,827 | 5/1986 | Wiltsie ......................................... | 82/11 |
| 4,653,360 | 3/1987 | Compton ...................................... | 82/18 |
| 5,104,268 | 4/1992 | Kitagawa ..................................... | 82/1.11 |
| 5,421,229 | 6/1995 | Grossmann ................................... | 82/129 |

FOREIGN PATENT DOCUMENTS

| | | |
|---|---|---|
| 51-41671 | 10/1976 | Japan . |
| 54-21691 | 2/1979 | Japan . |
| 63-22201 | 1/1988 | Japan . |
| 6-75814 | 9/1994 | Japan . |
| 6-312302 | 11/1994 | Japan . |

Primary Examiner—Henry W. H. Tsai
Attorney, Agent, or Firm—Frishauf, Holtz, Goodman, Langer & Chick, P.C.

[57] ABSTRACT

An apparatus for machining both inside and outside of a hollow workpiece (16) to impart thereto inner and outer curved surfaces that are contoured to be non-circular is disclosed. It includes workpiece supports (10, 11) that clamp the workpiece oriented substantially vertically from its opposite upper and lower sides to support it rotatably about its axis extending substantially vertically. A C-axis drive (18) acts on the workpiece supports to rotate the workpiece about that workpiece axis. The workpiece supports are driven by a Z-axis drive to move the workpiece in a direction of that workpiece axis. Also included are an exterior machining unit (24) having a cutting tool (26) arranged to be movable in a direction of X-axis that is orthogonal to the workpiece axis, and an interior machining unit (25) having a cutting tool (33) arranged to be movable in a direction of U-axis that is parallel to the X-axis. The cutting tool (26) in the exterior machining unit can be positioned to lie outside of the workpiece for to shape an outer surface of the workpiece while the cutting tool (33) in the interior machining unit can be inserted into the inside of the workpiece from an end side thereof to shape an inner surface of the workpiece.

7 Claims, 15 Drawing Sheets

MACHINING APPARATUS FOR WORKS HAVING NON-CIRCULAR CURVES

TECHNICAL FIELD

The present invention relates to an apparatus for machining a workpiece to form it with surfaces that are curved or contoured to be non-circular in cross section, e.g., which is capable of simultaneously machining both inside and outside of a hollow workpiece to impart thereto inner and outer peripheral surfaces that are curved or contoured to be non-circular in cross section.

BACKGROUND ART

A certain apparatus for machining a workpiece to yield a product with curved surfaces that are non-circular in cross section, as exemplified by a cam, piston or piston ring having a freely curved or sculptured surface, has so far been known. For example, JP S54-21691 A, JP S63-22201 A and JP H6-75814 B describe such apparatus that yield such products with precision as desired.

The machining apparatus disclosed in JP S54-21691 A is designed to produce a stack of piston rings and is described as characterized by including a workpiece support shaft adapted to carry a workpiece constituted by a piston ring workpiece aggregate comprising a plurality of piston ring workpieces stacked and held together, a tool support means for supporting a cutting tool so as to be radially displaceable in accordance with circularities of machinable surfaces of the piston rings, and at least two electro-mechanical stepping feed means that are with varying amounts of stepping feed and are computer controllable to displace the tool support means radially as desired. In the apparatus so constructed, rotating the workpiece support shaft with the piston ring aggregate carried thereon while driving the stepping feed means under computer control is described to provide machining of the workpieces with their inner and outer peripheral surfaces defined by free curves machined simultaneously with precision as sought.

JP S63-22201 A discloses a lathe with cutting tools for use to machine inner and outer surfaces of a piston ring workpiece, the lathe being designed so that displacing these tools with rotating cams radially of the piston ring workpiece may have the inner and outer peripheral surfaces formed simultaneously of a piston ring product.

The numerically controlled lathe disclosed in JP H675814 B includes a cutter mounting carriage that is movable by a linear motor towards and away from a workpiece such as to yield a piston ring with a skirt portion, the linear motor being adapted to be driven under numerical control by a computer to have an outer peripheral surface of the skirt portion formed by lathing the workpiece. The lathe has a guide section for supporting the carriage that reciprocates, and a plurality of sets of juxtaposed rotary members operable at the opposite sides of the carriage. Also included is a biasing means that supports one of the sets of rotary members to prevent the carriage from laterally moving so that a reaction force that when the workpiece being lathed exerts on the cutting tool may be accepted by both the rotary members and the biasing means. This provision is described to permit the carriage to reciprocate without jolting or shaking, which in turn provides, among others, permitting workpieces to be cut with precision.

The machining apparatus described in JP S54-21691 A, however, in which a piston ring workpiece aggregate is mounted on the workpiece support shaft that extends in a horizontal direction and is rotated therewith to have their outer and inner surfaces simultaneously cut, it has been found that chips caused in cutting its inner surface areas tend to stay inside of the workpiece. This inconveniently requires means for ejecting the chips to be additionally provided and, if they fail to be ejected while cutting is allowed to continue, permits the chips, physically to lower, or otherwise, by raising the temperature of the workpiece with their developing heat, to adversely affect, the cutting accuracy of the workpiece machined.

Also, a plurality of piston ring workpieces in order to be retained integrally in their aggregate form need to be compressed under an elevated pressure typically amounting to as high as 10 tons from its opposite sides. Then, if the workpiece should be supported to extend horizontally as taught in JP S54-21691 A, a very rigid mechanical structure is required to accommodate such a force of compression that is applied horizontally. Inconveniently, this renders the equipment large sized and costly.

Further, if the workpiece machined is an aggregate or stack of elements such as piston rings each with a given phase orientation which once shaped must be cut and divided or split in a subsequent machining step, it must be carried out with these shaped elements held to retain their oriented phase relationship.

To that end it has been customary to carry out such a shaped workpiece with its opposite ends held clamped with a hand carrier jig. However, the workpiece if constituted by piston rings stacked in a horizontal direction as taught in JP S54-21691 A is found to make the hand carrier jig poorly detachable. Also, the gravity that acts orthogonally to the direction in which the piston rings constituting the shaped workpiece are stacked is found to inconveniently cause, as it is carried out, the piston rings to easily get phase shift.

The machining apparatus described in JP S54-21691 A, especially in connection with FIG. 5, further requires that the tool support means having a cutting tool for machining the outside of a workpiece be mounted on a sliding head of which a movement is controlled by a pair of step feed means that are arranged back and forth lengthwise of it. The sliding head has on it a second sliding head that is capable of movement by the step feed means in the same direction as that in which the first sliding head is movable. And, a tool support means having a cutting tool for machining the inside of the workpiece is required to be mounted on the second sliding head. The apparatus so constructed of inconveniently has, of necessity, drive systems interlaced and complicated and, also complicating control units therefor, renders the entire equipment costly.

The lathe described in JP S63-22201 A employs a cam arrangement that mechanically effects feeding cutting tools to shape or machine the inside and outside of a workpiece, respectively. The lathe thus inconveniently requires the cams to be replaced each instance a piston ring geometry is altered. The replacement of such cams is time consuming and of poor efficiency. The need to prepare a number of cams that vary in geometry makes their maintenance and management laborious and inefficient, and raises the cost of production of piston rings.

Such a structure is also inconvenient in that a cam wears in servicing and a drive system in operation tends to develop a jolting, which makes it difficult to machine a workpiece with accuracy. A machining inaccuracy so caused by such as cam wear inconveniently cannot simply be compensated for.

The NC lathe described in JP H6-75814 B is not adapted to machine both inside and outside of a workpiece simultaneously and thus is unsatisfactory in productivity. The requirement for the inside and outside of a workpiece to be separately shaped adversely affects their machined concentricity and here again leaves much to be desired in achievable machining accuracy.

It is accordingly an object of the present invention to eliminate these disadvantages met in the prior art and to provide an apparatus that is capable of machining both inside and outside of a hollow workpiece simultaneously and quickly to impart thereto inner and outer curved surfaces that are non-circular in cross section with an increased precision, the apparatus having its production reduced and being rendered over its entire equipment less costly.

SUMMARY OF THE INVENTION

In order to achieve the object mentioned above there is provided in accordance with the present invention in a first form of embodiment thereof an apparatus for machining both inside and outside of a workpiece to impart thereto inner and outer surfaces that are contoured to be noncircular in section, which comprises: a workpiece support means for clamping the workpiece oriented substantially vertically, from its opposite upper and lower sides to support it rotatably about its axis extending substantially vertically; a C-axis drive means for acting on the said workpiece support means to rotate the said workpiece about the said axis; a Z-axis drive means for acting on the said workpiece support means to move the said workpiece in a direction of the said axis; an exterior machining means having a cutting tool arranged to be movable in a direction of X-axis that is orthogonal to the said workpiece axis, the said cutting tool being positionable to lie outside of the said workpiece for shaping an outer surface of the said workpiece; and an interior machining means having a cutting tool arranged to be movable in a direction of U-axis that is parallel to the said X-axis, the said cutting tool being adapted to be inserted into the inside of the said workpiece from an end side thereof for shaping an inner surface of the said workpiece.

The present invention also provides in a second form of embodiment thereof an apparatus for machining both inside and outside of a workpiece to impart thereto inner and outer surfaces that are contoured to be non-circular in cross section, which comprises: a workpiece support means for clamping the workpiece oriented substantially horizontally, from its opposite left hand and right hand sides to support it rotatably about its axis extending substantially horizontally; a C-axis drive means for acting on the said workpiece support means to rotate the said workpiece about the said axis; a Z-axis drive means for acting on the said workpiece support means to move the said workpiece in a direction of the said axis; an exterior machining means having a cutting tool arranged to be movable in a direction of X-axis that is orthogonal to the said workpiece axis, the said cutting tool being positionable to lie outside of the said workpiece for shaping an outer surface of the said workpiece; and an interior machining means having a cutting tool arranged to be movable in a direction of U-axis that is parallel to the said X-axis, the said cutting tool being adapted to be inserted into the inside of the said workpiece from an end side thereof for shaping an inner surface of the said workpiece.

In the constructions mentioned above, the apparatus should further comprises a control means for controlling the said exterior machining means and the said interior machining means synchronously with the said C-axis drive means so that the outer and inner surfaces of the workpiece can simultaneously be shaped synchronously with a rotation of the workpiece;

According to the constructions mentioned above in which the rotation of the workpiece and the movements of the cutting tools along the X-axis and the U-axis by the C-axis drive means and by the exterior and interior machining means are synchronously controlled and the Z-axis drive means to permit both the inside and outside of the workpiece to be simultaneously machined so as to yield a shaped product with inner and outer surfaces that are contoured to be non-circular in section, it can be seen that in contrast to the prior art in which the inside and outside of the workpiece have had to be machined separately, a machining result sought is obtained with a much increased productivity and, without an impaired concentricity over the inner and outer surfaces, hence with an enhanced machining accuracy as well.

Also, the constructions described above provide an individual drive means with an essentially independent operability and hence simplify the structure and the control system of the prior apparatus in which various drive means are interleaved. Thus, the price of the overall equipment can be reduced. Further, the eliminated need for operations to change cams for one sort and another of workpieces can largely save the time to prepare for a change of workpieces and, eliminating the need to store a large number of cams, eases maintenance and handling of the machining apparatus.

Especially when the first form of embodiment described is adopted, chips produced inside of a workpiece are allowed to fall and does not stay within the workpiece. Thus, the chips can no longer reduce machining accuracy and, with the need eliminated to provide a separate means to discharge them, does simplify the construction of the equipment.

That form of embodiment which also provides clamping and retaining a workpiece from its upper and lower sides offers a particular advantage when the workpiece comprises a compressed and thereby formed stack of elements machined to yield such as piston rings. In contrast to an alternative arrangement in which such a workpiece is clamped laterally, this arrangement advantageously reduces the size of the apparatus that must carry means to compress it and, also simplifying the structure, makes the equipment less costly to produce.

The further ability to introduce and remove a workpiece as it is held in the form of vertically stacked elements such as to yield piston rings prevents the elements from deviating from an in-phase position. Thus, the carrying in and carrying out of a workpiece can be carried out automatically with a robotic apparatus which permits a machining operation as desired to be automatized and unmanned.

In the constructions described above it is desirable that the control means be adapted to control or operate the exterior and interior machining means separately.

Such a construction permits both inner and outer surfaces of a machined workpiece if varied in curvature or geometry as required to be shaped simultaneously, thus enhancing its productivity.

In the constructions described, it is also desirable that the interior machining means comprise a U-axis slide movable along the U-axis, and a balling bar mounted on an end of the U-axis slide to orient substantially vertically and to be inserted into the inside of the workpiece from a lower end side thereof.

Such a construction permits a workpiece oriented substantially vertically or horizontally and clamped from it opposite upper and lower sides or its opposite left and right hand sides to be accurately machined over its inner surface by the interior machining means. The construction can be widely used because changes in the length of workpieces can be coped with simply by exchanging this balling bar.

In the constructions described, it is convenient if a linear motor is used to drive the U-axis slide in the interior machining unit along the U-axis.

A linear motor that is low in load inertia ratio can advantageously be used to cope with the problem that the cutting tool moved rapidly tends to be accelerated. Since the rate at which the cutting tool is moved can thus be raised to raise the speed at which the workpiece is shaped, productivity is increased. The use of such a motor also prevents a drive source for the interior machining means from being overloaded and because of its reducible size makes it possible for the interior machining means as a unit to be smaller in size.

It is advantageous if the workpiece is an aggregate of elements that are machined to provide piston rings, which are axially stacked in a given phase.

Many piston rings each with inner and outer surfaces varied in curved geometry can thereby be produced accurately and efficiently with an enhanced machining productivity.

BRIEF DESCRIPTION OF THE DRAWINGS

The present invention will better be understood from the following detailed description and the drawings attached hereto showing certain illustrative embodiments of the present invention. In this connection, it should be noted that such embodiments as illustrated in the accompanying drawings hereof are intended in no way to limit the present invention but to facilitate an explanation and understanding thereof.

In the accompanying drawings.

BEST MODES FOR CARRYING OUT THE INVENTION

The invention will be described in greater detail below with reference to the accompanying drawings, first with regard to a first embodiment thereof.

Figure 1:
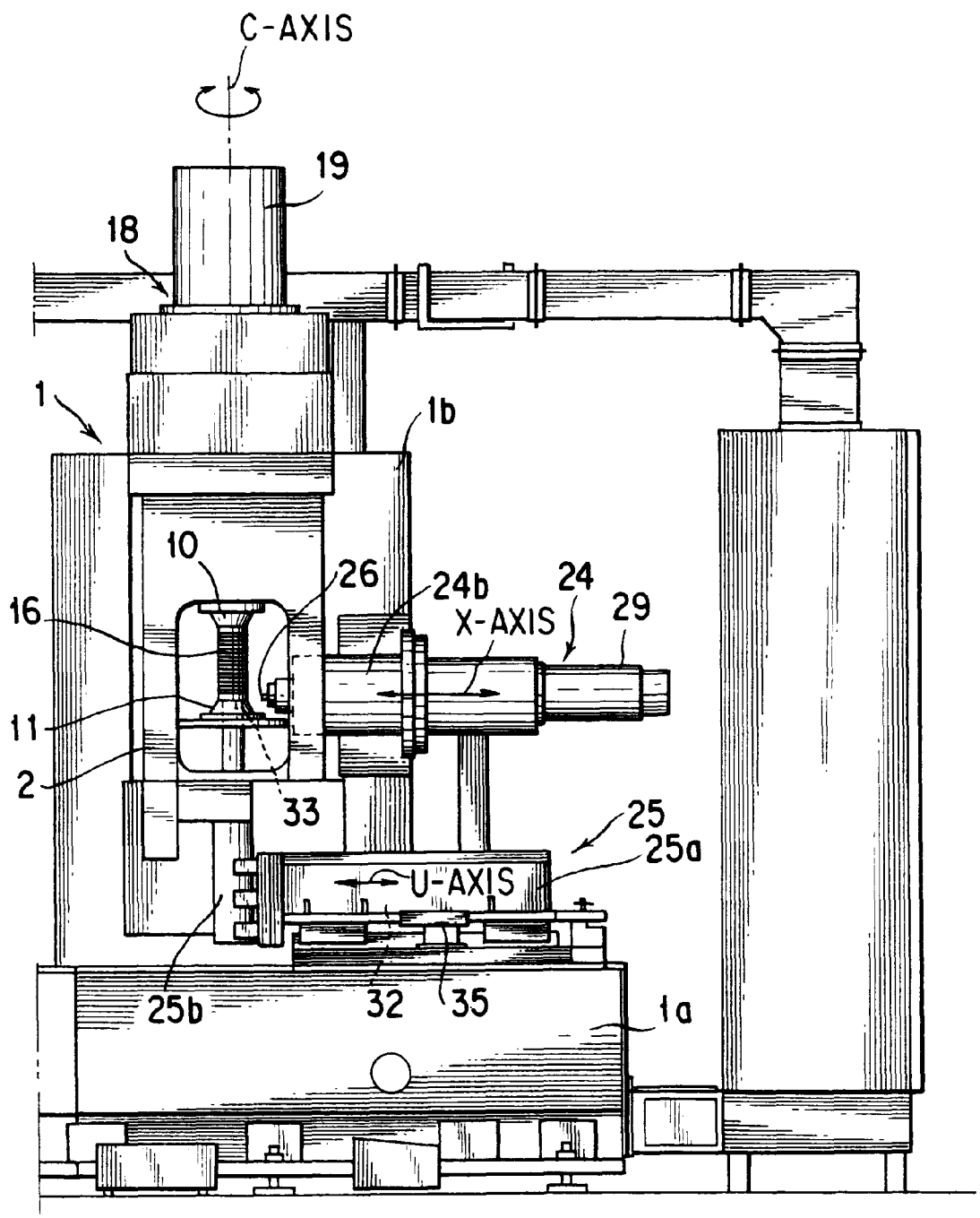
FIG. 1 is a front view showing an machining apparatus embodied in a first form in accordance with the present invention.
Figure 2:
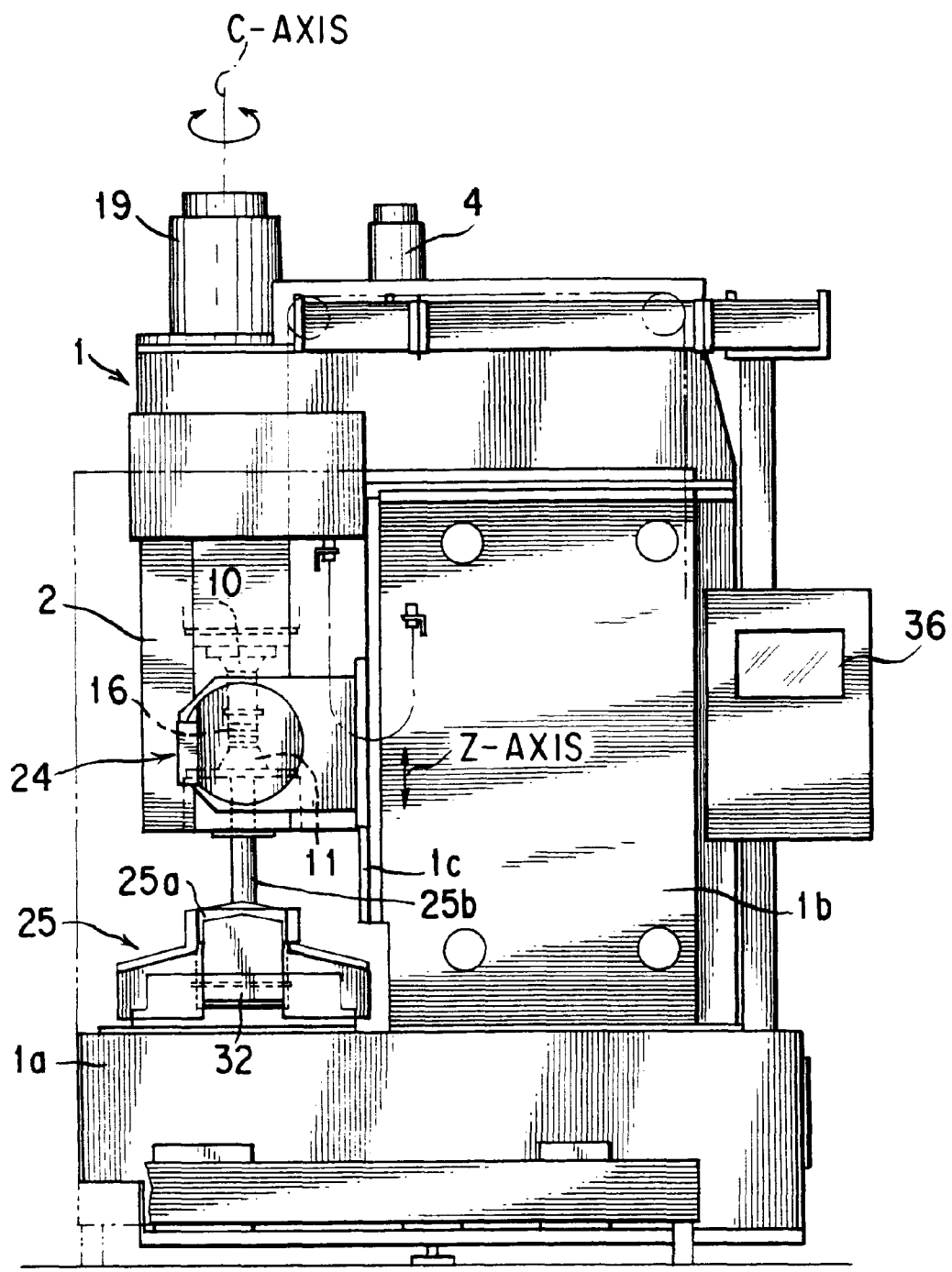
FIG. 2 is a side view showing a side view of the machining apparatus shown in FIG. 1.
Figure 3:
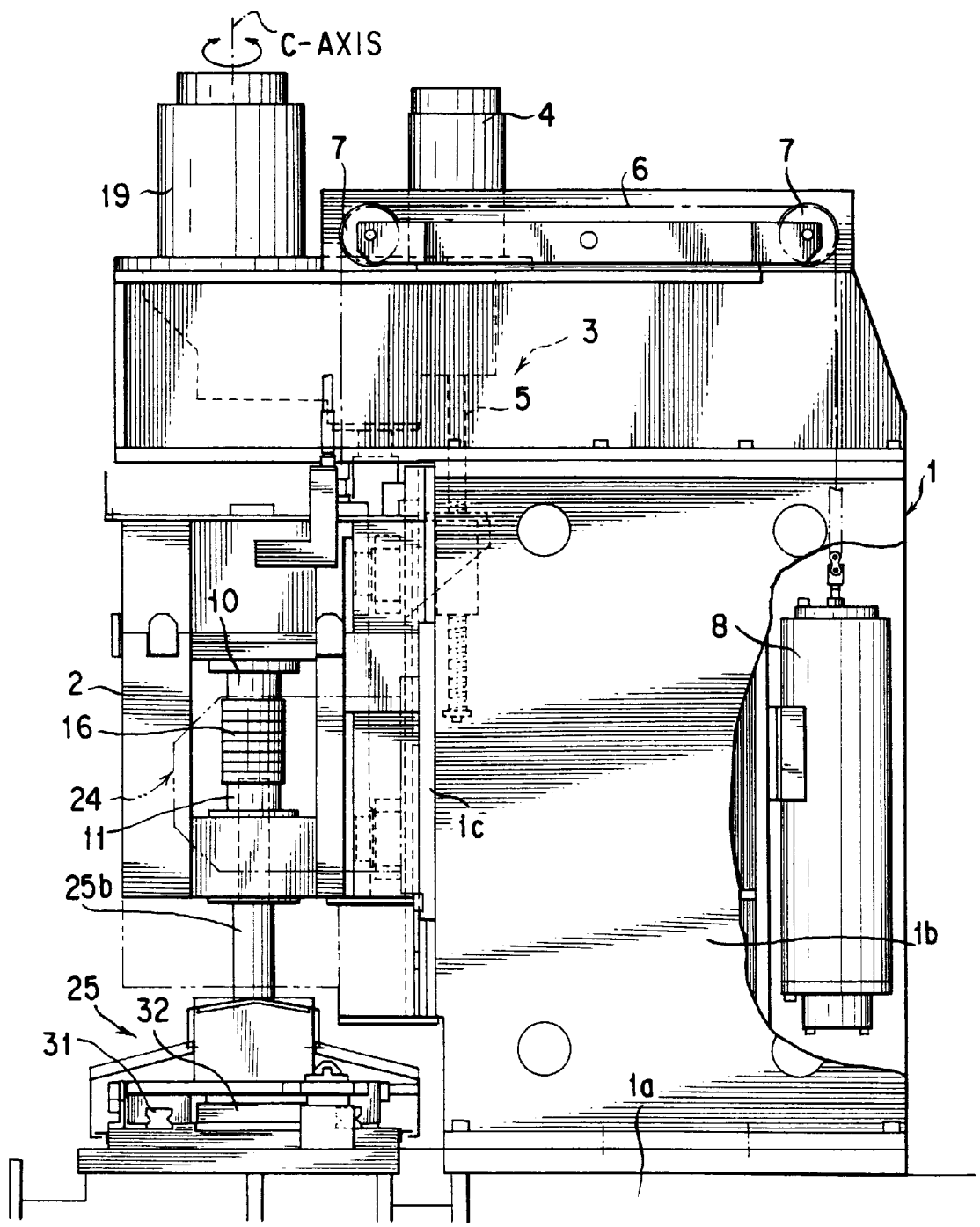
FIG. 3 is an enlarged side view in part broken showing essential portions of the machining apparatus shown in FIGS. 1 and 2.

In FIGS. 1 to 3, a machining apparatus in this embodiment is shown generally by reference numeral 1. The apparatus 1 includes a bed 1a on which a column 1b is mounted to stand. In front of the column 1b, a Z-axis slide 2 is arranged to be movable by a Z-axis drive means 3 vertically in a direction of Z-axis.

The Z-axis slide 2 is carried on a guide rail 1c that comprises a ball type linear guide laid on the face of the column 1b, and is arranged to be movable vertically by means of a Z-axis motor 4 mounted on the column 1b.

Figure 4:
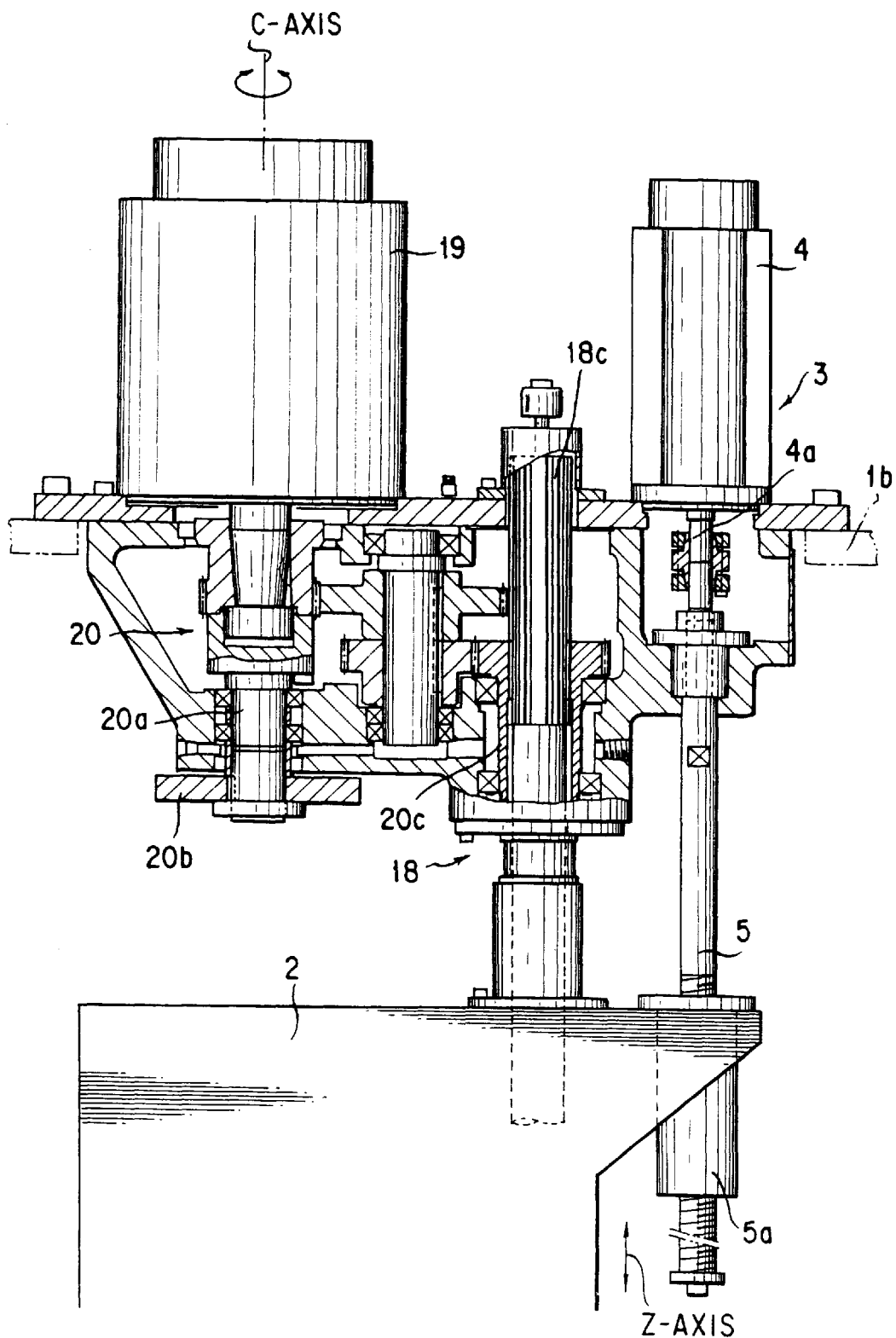
FIG. 4 is a cross sectional view showing a C-axis and a Z-axis drive means included in the machining apparatus shown in FIGS. 1 to 3.

Specifically, as shown in FIG. 4 the Z-axis motor 4 has a drive shaft 4a to which a threaded shaft 5 comprising a ball screw is connected. In mesh with the threaded shaft 5 is a nut member 5a that is fastened to the Z-axis slide 2 so that rotating the threaded shaft 5 normally and reversely by the Z-axis motor 4 may cause the Z-axis slide 2 to move vertically along the guide rail 1c. One end of a wire or rope 6 is shown as being bound to the top of the Z-axis slide 2.

The wire or rope 6 has a mid portion wound around a pair of pulleys 7 each of which is rotatably carried on the top of the column 1b. The other end of the wire or rope 6 has a counter weight 8 suspended in the rear side of the column 1b so that with the Z-axis slide 2 and the counter weight 8 balanced in gravity, the Z-axis motor 4 of a small capacity may be enough to move the Z-axis slide 2 vertically.

The Z-axis slide 2 also has an upper workpiece support means 10 and a lower workpiece support means 11 that are vertically spaced apart.

Figure 5:
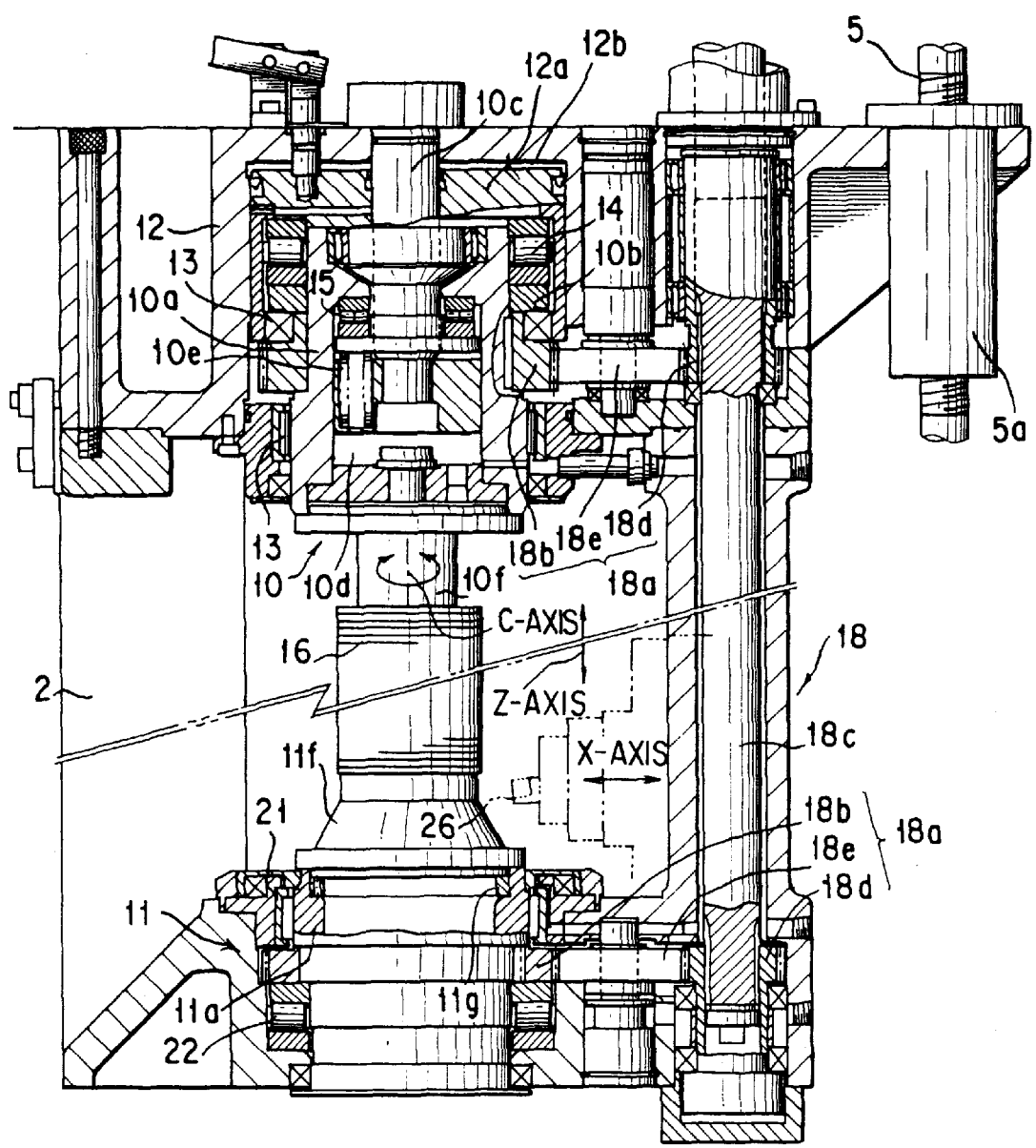
FIG. 5 is a cross sectional view showing a workpiece support means included in the machining apparatus shown in FIGS. 1 to 3.

As shown in FIG. 5 the upper workpiece support means 10 is disposed below a hydraulic cylinder 12 arranged at an upper part of the Z-axis slide 2, and has an upper spindle 10a disposed below a piston 12a that is received upwards in the hydraulic cylinder 12.

The upper spindle 10a which is a hollow cylinder is carried via a plurality of bearings 13 to the lower part of the hydraulic cylinder 12 so as to be capable of vertically moving along a C-axis (i. e. the longitudinal axis of the upper spindle 10a) that is parallel to the Z-axis and also of rotating about the C-axis. The lower side surface of the piston 12a is held in a contacting relationship via a thrust bearing 14 with the upper surface of a ring 10b fitted on the upper spindle 10a so that supplying pressure fluid into a fluid chamber 12b of the hydraulic cylinder 12 may press the upper spindle 10a downwards via the piston 12a.

The hydraulic cylinder 12 has in its center region a fixed shaft 10c whose upper end is fastened to the upper surface of the hydraulic cylinder 12.

The fixed shaft 10c that extends through the piston 12a has its lower end side reaching the center region of the spindle 10a. A plurality of compression springs 10e are disposed on a spring seat 10d forming the lower end of the fixed shaft 10a to energize the upper spindle 10a upwards via a bearing 15.

The upper spindle 10a is also provided in its lower part with an upper clamp head 10f that clamps a workpiece 16 between it and a lower clamp head 11f included in the lower workpiece support means 11. Attached by keying around the upper spindle 10a is a follower gear 18b in a gear train 18a that is included in the C-axis drive means 18.

As shown in FIG. 4 the C-axis drive means 18 has a C-axis motor 19 that comprises a servo motor mounted on the top of the column 1b with its output shaft connected to the input shaft 20a of a reducer 20.

The input shaft 20a of the reducer 20 has a fly wheel 29b attached thereto in order to stabilize rotation of the workpiece 16 to prevent it from rotating unevenly. The reducer 20 has its output shaft 20c that is in a spline engagement with an upper end portion of the drive shaft 18c, formed by a spline shaft, for the C-axis drive means 18 so that the drive shaft 18c may be rotated normally and reversely by the C-axis motor 19 via the reducer 20.

The drive shaft 18c is rotatably supported to extend vertically and also parallel to the longitudinal axis of the workpiece 16 and has a mid and a lower portion each of which is in a spline engagement with a drive gear 18d in the gear train 18a that is provided in each of the upper and lower workpiece support means 10 and 11.

Each of the drive gears 18d is set in mesh, via an intermediate gear 18e, with the follower gear 10b that is fitted onto each of the upper and lower spindles 10a and 11a so that then C-axis motor 19 may rotate both the upper and lower spindles 10a and 11a synchronously in a same direction via the drive shafts 18c and the respective gear trains 18a.

The lower spindle 11a is also a hollow cylinder as the upper spindle 10a and is rotatably supported on the Z-axis slide 2 side via a bearing 21. A thrust bearing 22 is interposed between the Z-axis slide 2 and the follower gear 18b keyed onto the lower spindle 11a.

The lower clamp head 11f for the lower workpiece support means 11 is mounted on the top of the lower spindle 11a to permit the workpiece 16 to be clamped between it and the upper clamp head 10f attached to the upper spindle 10a in the upper workpiece support means 10.

It should be noted at this point that when the upper and lower spindles 10a and 11a are synchronously rotated by the C-axis motor 19, a backlash in the gear trains 18a and a spline in the drive shaft 18 may cause the upper and lower spindles 10a and 11b to rotate unevenly, which results in a deviation in phase of rotation between them.

In order to avoid that, in starting to machine the workpiece 16, a plate 11g shown as fitted between the lower spindle 11a and the clamp head 11f is adapted to be fixed to the lower spindle 11a by a suitable locking means (not shown) such as a lock-tight where a backlash in the upper and lower gear trains is removed.

The machining apparatus 1 further includes, in a mid level of the upper column 1b an exterior machining unit 24 to shape the workpiece 16 with a given outer surface, and on the bed 1a an interior machining unit 25 for shaping the workpiece 16 with a given inner surface simultaneously with the outer surface being shaped.

Figure 6:
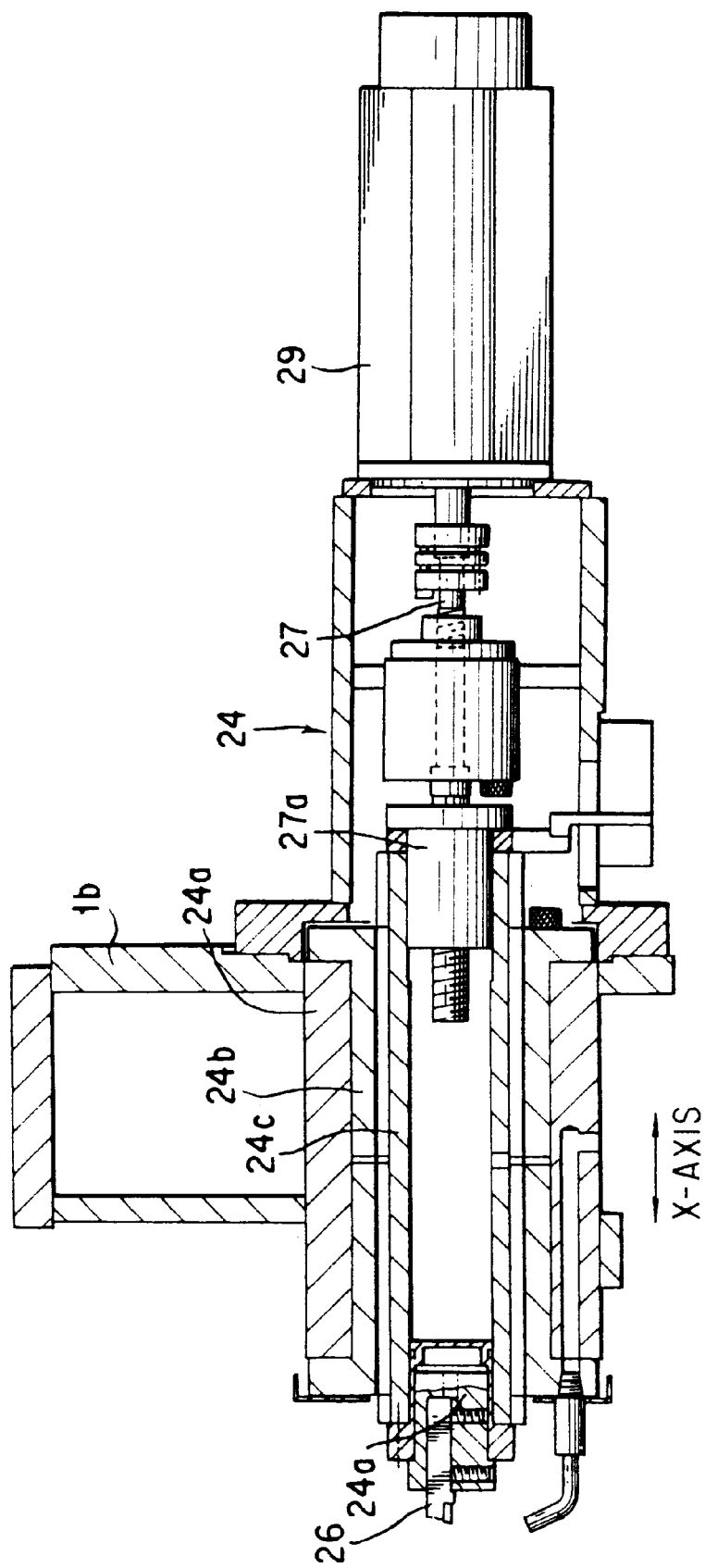
FIG. 6 is a cross sectional view showing an exterior machining means included in the machining apparatus shown in FIGS. 1 to 3.

The exterior machining unit 24 comprises a tool support member 24c which as shown in FIG. 6 is supported via a ball spline 24a in a cylindrical guide member 24a fastened horizontally to the column 1b so it may be moved in the direction of an X-axis that is orthogonal to the C-axis.

The tool support member 24c has at its end proximal to the workpiece 16 and removably mounted thereto via a tool mounting member 24d a cutting tool 26 for machining an outside of the workpiece 16. The tool support member 24c has at its opposite end a nut member 27a fastened thereto which is in mesh with one end portion of a threaded shaft 27 that comprises a ball screw.

The threaded shaft 27 has it other end side coupled to the output shaft of an X-axis motor 29 that comprises a servo motor mounted to the column 1b with a bracket 28 so that the X-axis motor 29 rotating the threaded shaft 27 in one and the other directions (normally and reversely) may move the cutting tool 26 towards and away from the workpiece 16.

Figure 7:
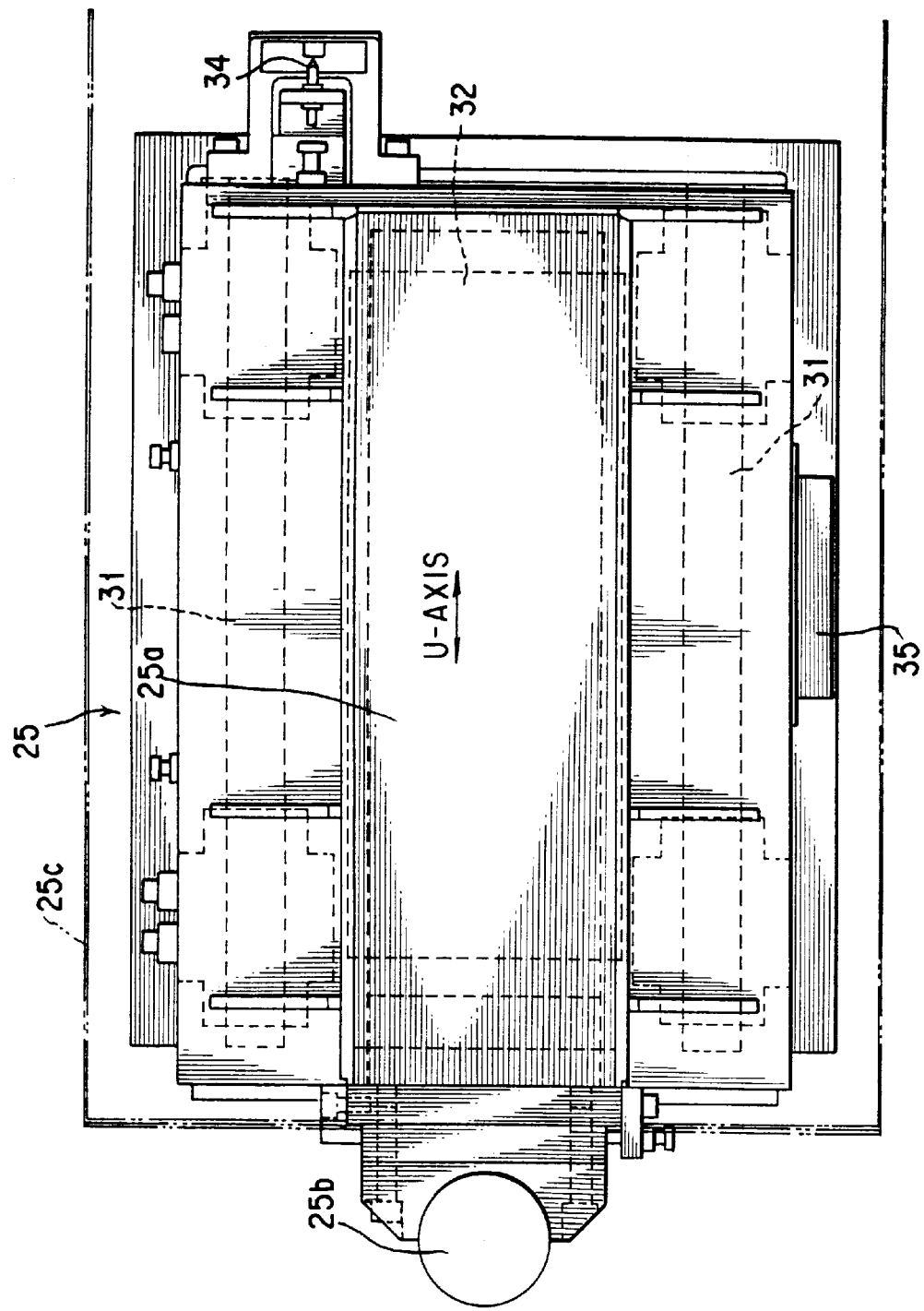
FIG. 7 is a plan view showing an interior machining means included in the machining apparatus shown in FIGS. 1 to 3.
Figure 8:
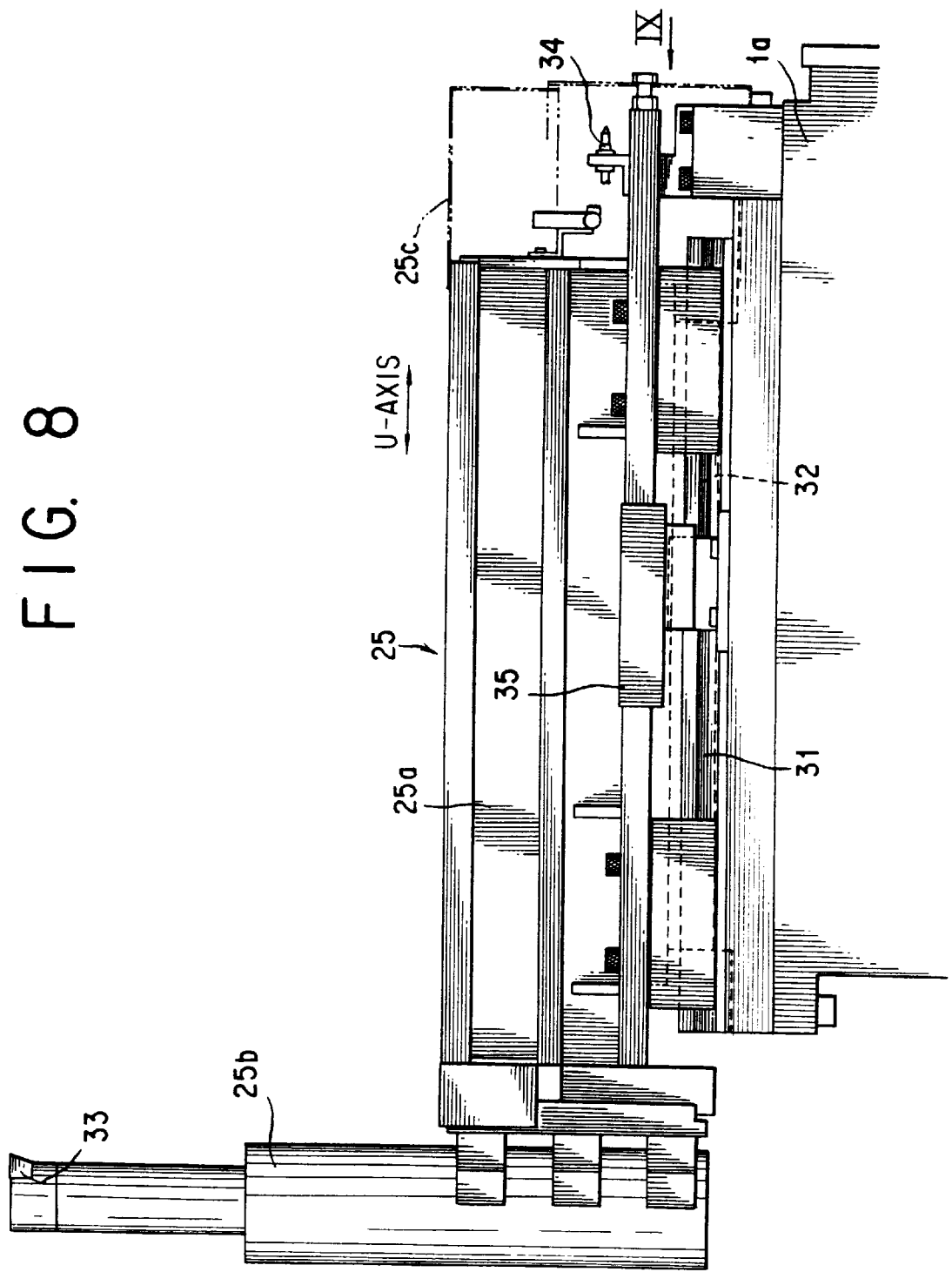
FIG. 8 is a side view of the interior machining means shown in FIG. 7.
Figure 9:
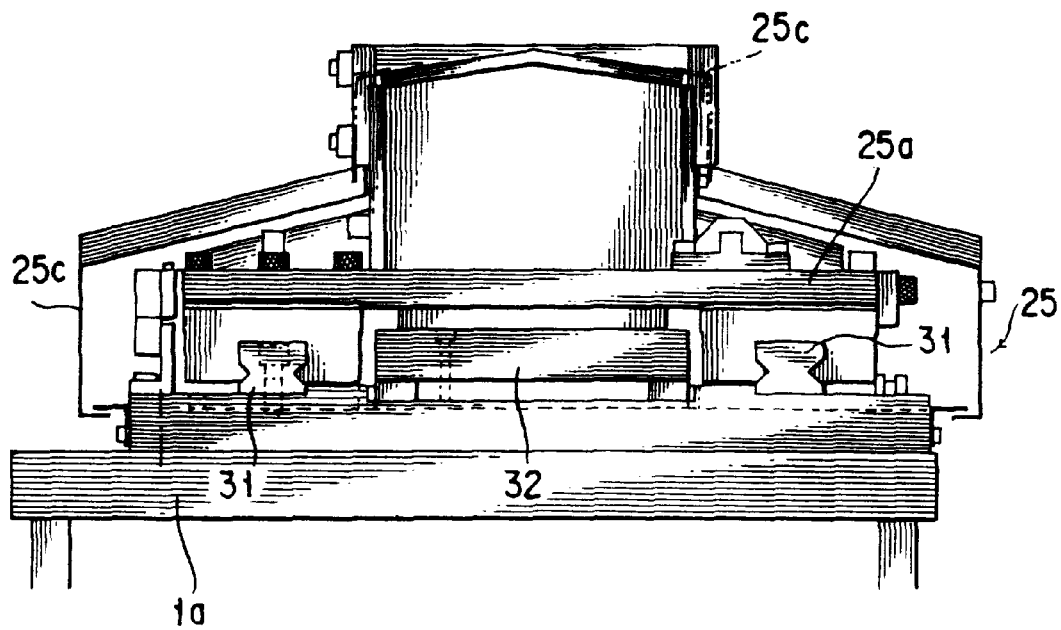
FIG. 9 is an elevational view of the interior machining means taken and viewed in the direction of the arrow IX in FIG. 8.

The interior machining unit 25 for shaping an inside of the workpiece 16 includes, as shown in FIGS. 7 to 9, a U-axis slide 25a that is carried on a pair of guide rails 31 each comprising a roller type linear guide which is laid on the bed 1a to extend in a direction of the U-axis parallel to the X-axis.

A space above the U-axis slide 25a is sealed, as shown in FIG. 9, by a roof cover 25c to ease removal of chips from a cutting zone. To drive the U-axis slide 25a along the U-axis, a U-axis motor 32 comprising a linear servo motor is provided as mounted on the bed 1a below the U-axis slide 25a.

The U-axis slide 25a has its forward end reaching a point beneath the lower spindle 11a, at which is fastened thereto the lower end of a boring bar 25b as mounted substantially vertically thereto.

The boring bar 25b has an upper end side that past the inside of the lower spindle 11a reaches the inside of the workpiece 16, and has its upper end at which a cutting tool 33 for machining an interior of the workpiece 16 is mounted detachably thereto.

As shown in FIG. 8, the apparatus is also provided with a U-axis origin detector means 34 for detecting the position of an origin of the U-axis slide 25a and a slide detector 35 that may comprise a linear scale for detecting the position of the U-axis slide 25a moving along the U-axis. These detector means 34 and 35 are constructed and arranged to furnish signals into an NC unit 36 (see FIG. 2) that is designed to control the Z-axis motor 4, the C-axis motor 19, the X-axis motor 29, the U-axis motor 32 and so forth.

An explanation will now be given of an operation for machining a workpiece 16 destined to provide, e. g., piston rings, with the apparatus constructed as so far described.

Figure 10:
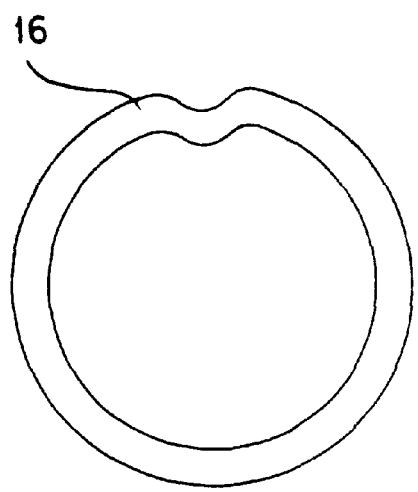
FIG. 10 is a plan view showing a workpiece shaped by the apparatus shown in FIGS. 1 to 7.

A product such as a piston ring into which the workpiece 16 is machined is represented as shown in FIG. 10 in cross section having outer and inner surfaces that are curved to be non-circular and different in curvature or geometry. Providing both an exterior machining unit 24 and an interior machining unit 25 then becomes essential.

Further, in order for both inside and outside of the workpiece 16 that is being rotated by the C-axis motor 19 to be simultaneously machined, the X-axis, U-axis and Z-axis motors 29, 32 and 4 must be operated synchronously with the C-axis motor 19 under NC, and to this end, a standard cycle control makes it time-consuming to process movement data and therefore is inadequate to adopt.

Accordingly, the first embodiment of the invention described is designed to adopt either a rapid cycle control or a DNC mode in operating the NC unit 36 for a machining purpose as described.

When a rapid cycle control mode is adopted in operating the NC unit 36, data converted for a movement to be effected per unit processing time for each axis, a number of its cycles of repetition and so forth are registered in the data area and the header prepared for this control mode in the NC unit 36 to permit the latter to be operated in this mode under a main program for machining.

In initiating a machining operation, a plurality of piston ring blanks are stacked in phase to form a hollow cylindrical workpiece 16. The workpiece 16 is then clamped with a pair of hand carrier jigs not shown from the upper and lower sides and, as it is held so, is carried into the machining apparatus 1 so as to be set between the clamp heads 10f and 11f provided respectively on the upper and lower spindles 10a and 11a.

With the workpiece 16 so set, the pressure chamber 12b in the hydraulic cylinder 12 is supplied with pressure fluid to lower both the piston 12a and the upper spindle 10a and thereby to firmly clamp, between the clamp head 10f on the upper spindle 10a and the clamp head 11a on the lower spindle 11a, the workpiece 16 with its longitudinal axis held coincident with the common axis of the upper and lower spindles 10a and 11a.

The workpiece 16 is phase-indexed in that state. Then, driving the C-axis motor 19 causes the upper and lower spindles 10a and 11a to be synchronously rotated with the C-axis drive means 18, thereby driving the workpiece 16 into rotation. The cutting tool 26 in the exterior machining unit 24 and the cutting tool 33 in the interior machining unit 33 are now ready to engage, both, say, from their lower end sides, the outer and inner surfaces of the workpiece 16 to shape both these surfaces simultaneously.

Here, in order to impart to the hollow cylindrical workpiece 16 outer and inner sculptured surfaces or contours given that vary in curvature or geometry, the X-axis and the U-axis motors 29 and 32 are operated independently of each other and in synchronism with the C-axis workpiece rotation under NC to so machine the workpiece 16 synchronously both outside and inside. And, as machining proceeds, the Z-axis motor 4 is controllably driven to so move the Z-axis slide 2 downwards to permit the workpiece 16 to be machined both inside and outside over its given entire length. In the course of machining, it should be noted that those chips produced and emitted from the inside of the workpiece 16 are allowed to fall off through the inside of the lower spindle 11a downwards. A possible damage of the machined surfaces by such chips is thereby avoided. A possible damage of the cutting tool 33 as a result of chips striking through a gap between the workpiece 16 and the cutting tool 33, reducing its serviceable life, is also avoided thereby, so is machining inaccuracy as caused by such chips.

After the workpiece 16 has been machined, the U-axis motor 29 and the U-axis motor 32 are driven to move the X-axis slide 2 and the U-axis slide 25a back to their original positions and the X-axis motor 4 is driven to move the Z-axis slide 2 back to its original position. Thereafter, discharging a pressure fluid from the pressure chamber 12b in the hydraulic cylinder 12, permitting the upper spindle 10a to rise under the action of the compression spring 10e unclamps the workpiece 16.

After the workpiece 16 is so unclamped, the hand carrier jig are used to clamp the workpiece 16 from the upper and lower sides and to carry it out from the space between the clamp heads 10f and 11f. For a new workpiece, the operation described may be repeated.

A second embodiment of the present invention will now be explained in detail with reference to the drawings.

Figure 11:
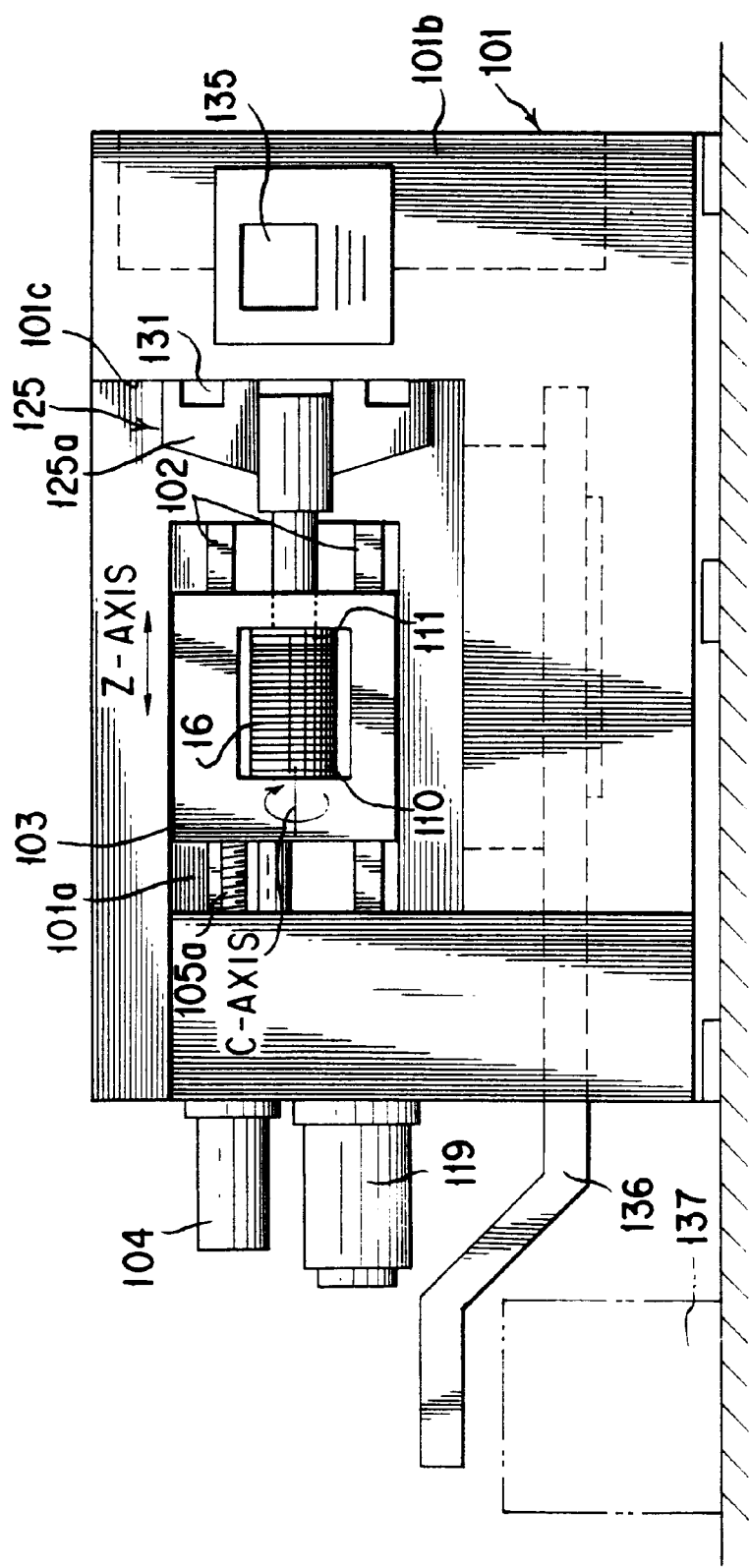
FIG. 11 is a front view showing a machining apparatus embodied in a second form in accordance with the present invention.
Figure 12:
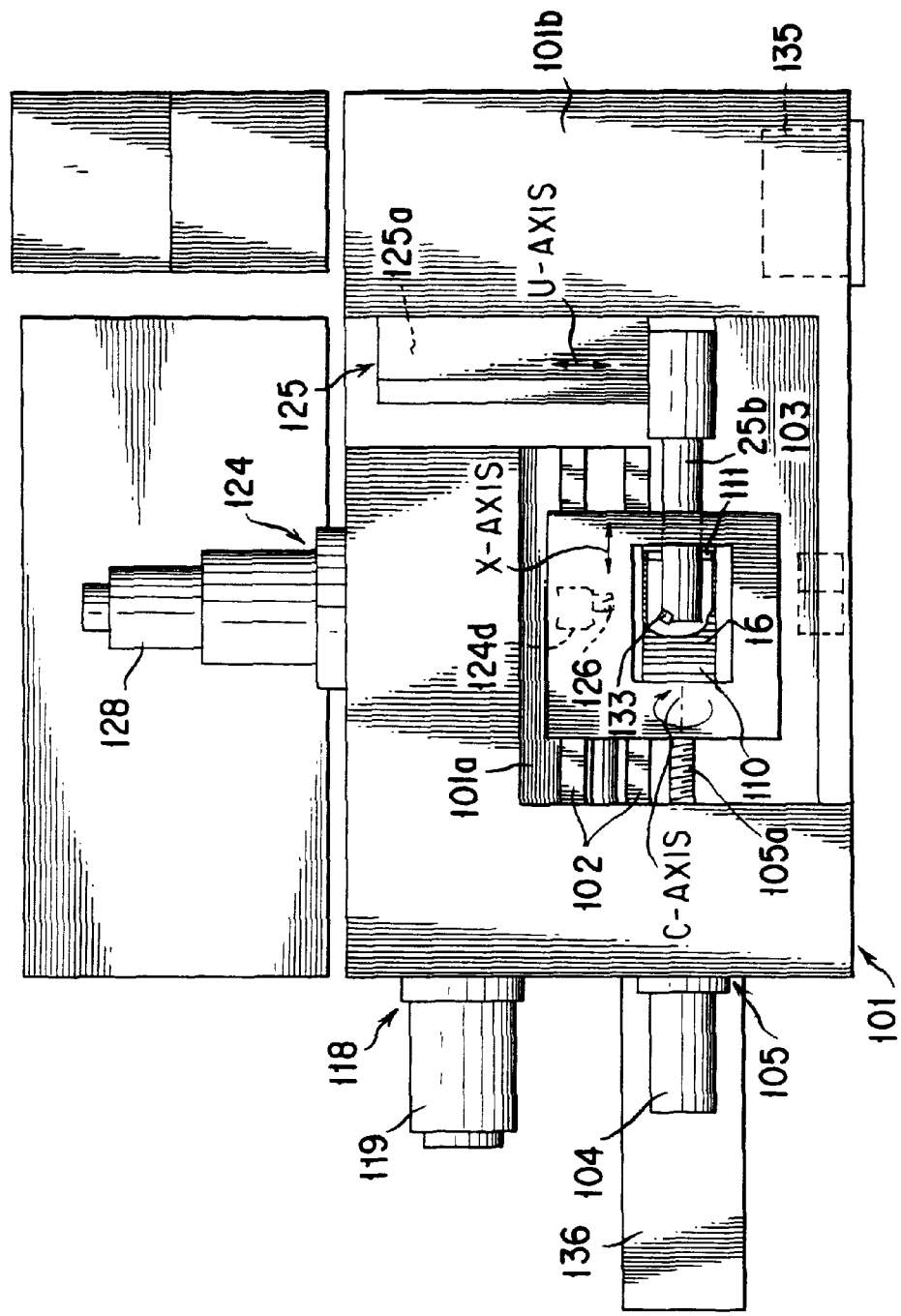
FIG. 12 is a plan view of the machining apparatus shown in FIG. 11.
Figure 13:
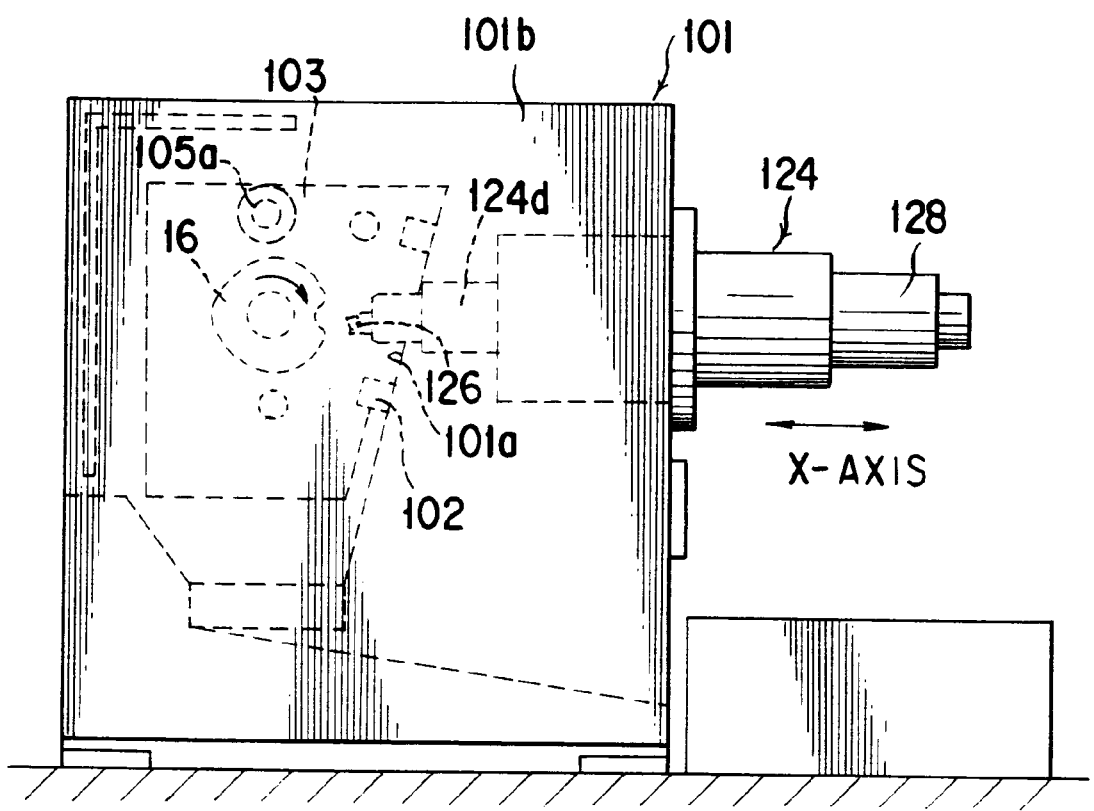
FIG. 13 is a side view showing the machining apparatus shown in FIGS. 11 and 12.

Referring to FIGS. 11 to 13, a machining apparatus generally designated by reference numeral 101 comprises a column 101b having an inclined slide mounting surface 101a rearwards. A guide rail 102 comprising a pair of linear guides that are vertically spaced apart and extend parallel in a left and right direction (Z-axis direction) is laid on the slide mounting surface 101a. A Z-axis slide 103 is supported on the guide rail 102 to be movable in a direction of Z-axis.

A Z-axis motor 104 comprising a servo motor that constitutes a drive source for a Z-axis drive means 105 is mounted to a left side surface of the column 101b via a gear box 120a that is included in a reducer 120 to be later described. The Z-axis motor 104 has an output shaft 104a connected to a threaded shaft 105a comprising a ball screw. The threaded shaft 105a is in mesh with a nut member 105b that is fastened to the Z-axis slide 103 so that the Z-axis motor 104 rotating the threaded shaft 105a normally or reversely may cause the Z-axis slide 103 to move along the guide rail 102 in a direction of Z-axis.

The Z-axis slide 103 has, at its left hand and right hand sides, a pair of workpiece support means 110 and 111, respectively.

Figure 14:
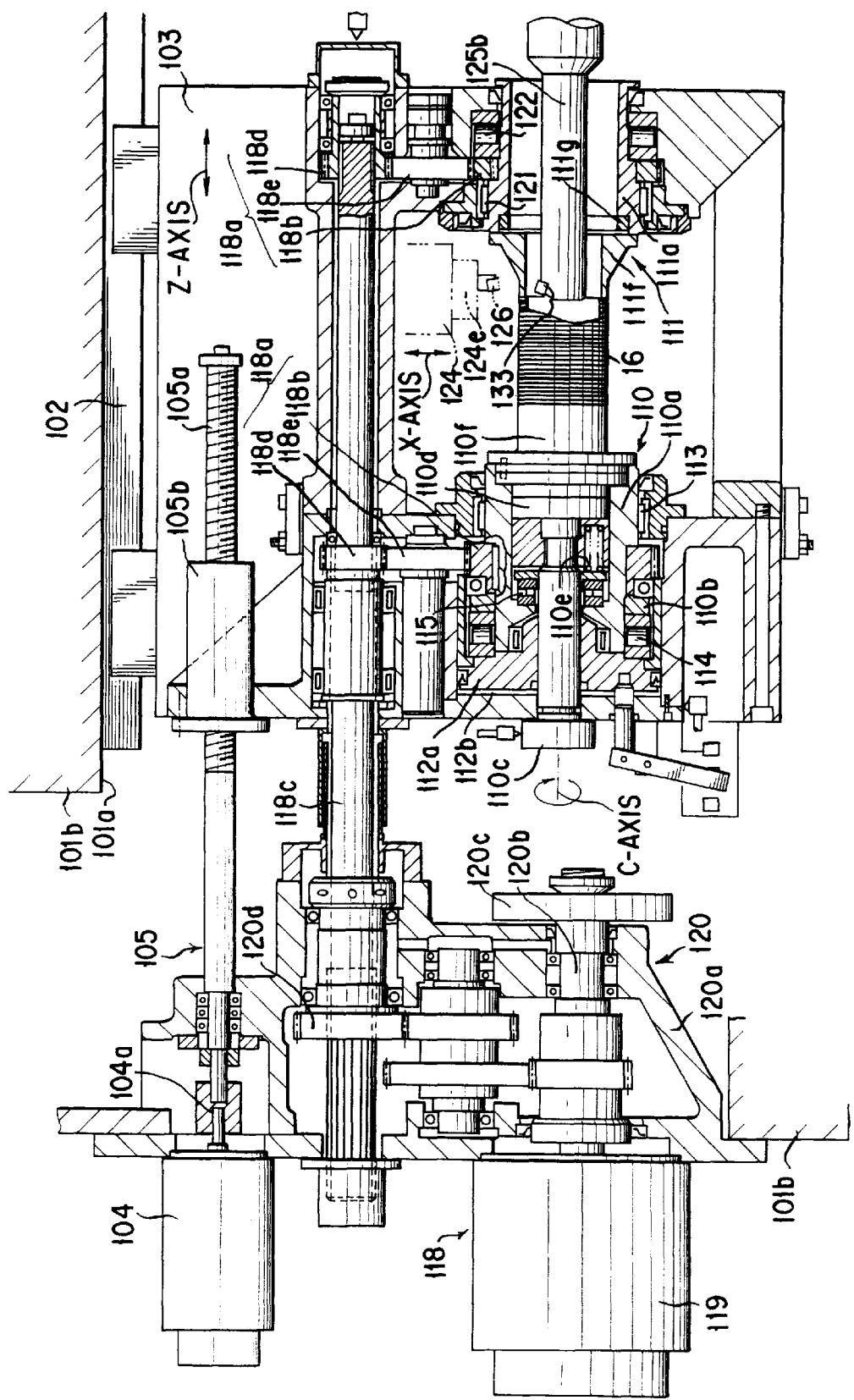
FIG. 14 is a cross sectional view showing a C-axis and a Z-axis drive means included in the machining apparatus shown in FIGS. 11 to 13.

The left hand side workpiece support means 110, as shown in FIG. 14, is located at rightward of a hydraulic cylinder 112 arranged at a left hand side of the Z-axis slide 103 and includes a spindle (left hand side spindle) 110a located at rightward of a piston 112a received in the hydraulic cylinder 112.

The left hand side spindle 110a is in the form of a hollow cylinder and is supported via a plurality of bearings 113 by the hydraulic cylinder 112 so as to be not only movable rightwards and leftwards along a C-axis (represented by the longitudinal axis of the left hand side spindle 110a) but also rotatable about the C-axis. And, the end surface of the piston 112a is held in contact via a thrust bearing 114 with the end surface of a ring 10b that is fitted on the left hand side spindle 110a so that supplying a pressure chamber 112b in the hydraulic cylinder 112 with pressure fluid may press via the piston 112a the left hand side spindle 110a rightwards.

The hydraulic cylinder 112 has a center region of it a fixed shaft 110c whose one end is fastened to the end surface of the hydraulic cylinder 112.

The fixed shaft 110c has the other end side which passes through the piston 112a, then reaching a center of the left hand side spindle 110a. A plurality of compression springs 110e are arranged on a spring seat 110d attached to that other end of the fixed shaft 110c to energize the left hand side spindle 110a leftwards.

The left hand spindle 110a is provided at its end with a clamp head 110f that acts to clamp the workpiece 16 between it and a clamp head 111f provided in the right hand side workpiece support means 111. Attached around the left hand side spindle 110a is a follower gear 118b keyed in a gear train 118a that is included in the C-axis drive means 118.

As shown in FIG. 14, the C-axis drive means 118 has a C-axis motor 119 that comprises a servo motor attached to a gear case 120a which is in turn attached to a left hand side end face of the column 1b. The C-axis motor 119 has its output shaft connected to the input shaft 129b of a reducer 120.

The input shaft 129b of the reducer 120 has a fly wheel 120c attached thereto in order to stabilize rotation of the workpiece 16 to prevent it from rotating unevenly. The reducer 120 has its output shaft 120c that is in a spline engagement with a left hand side end portion of the drive shaft 118c, formed by a spline shaft, for the C-axis drive means 118 so that the drive shaft 118c may be rotated normally and reversely by the C-axis motor 119 via the reducer 120.

The drive shaft 118c is rotatably supported to lie horizontally and also parallel to the longitudinal axis of the workpiece 16 and has a mid and a right hand side end portion each of which is in a spline engagement with a drive gear 118d in the gear train 118a that is provided in each of the left hand side and right hand side workpiece support means 110 and 111.

Each of the drive gears 118d is set in mesh, via an intermediate gear 118e, with the follower gear 110b that is fitted onto each of the left hand side and right hand side spindles 110a and 111a so that the C-axis motor 119 may rotate both the left hand side and right hand side spindles 110a and 111a synchronously in a same direction via the drive shafts 118c and the respective gear trains 118a.

The right hand side spindle 111a is also a hollow cylinder as is the left hand side spindle 110a, and is rotatably supported on the Z-axis slide 103 side via a bearing 121. A thrust bearing 122 is interposed between the Z-axis slide 103 and the follower gear 118b keyed onto the right hand side spindle 111a.

The clamp head 111f included in the right hand side workpiece support means 111 is mounted to the right hand side spindle 111a to permit the workpiece 16 to be clamped between it and the clamp head 110f attached to the left hand side spindle 110a in the left hand side workpiece support means 110.

It should be noted at this point that when the left hand side and right hand side spindles 110a and 111a are synchronously rotated by the C-axis motor 119, a backlash in the gear trains 118a and a spline in the drive shaft 118 may cause the left hand side and right hand side spindles 110a and 111b to rotate unevenly, which results in a deviation in phase of rotation between them.

In order to prevent that, in starting to machine the workpiece 16, a plate 111g shown as fitted between the right hand side spindle 111a and the clamp head 111f is adapted to be fixed to the right hand side spindle 111a by a suitable locking means (not shown) such as a lock-tight where a backlash in the upper and lower gear trains is removed.

The machining apparatus further includes, on the column 101b, an exterior machining unit 124 to shape the workpiece 16 with a given outer surface, and on the column 101b an interior machining unit 125 for shaping the workpiece 16 with a given inner surface simultaneously with the outer surface being shaped.

Figure 15:
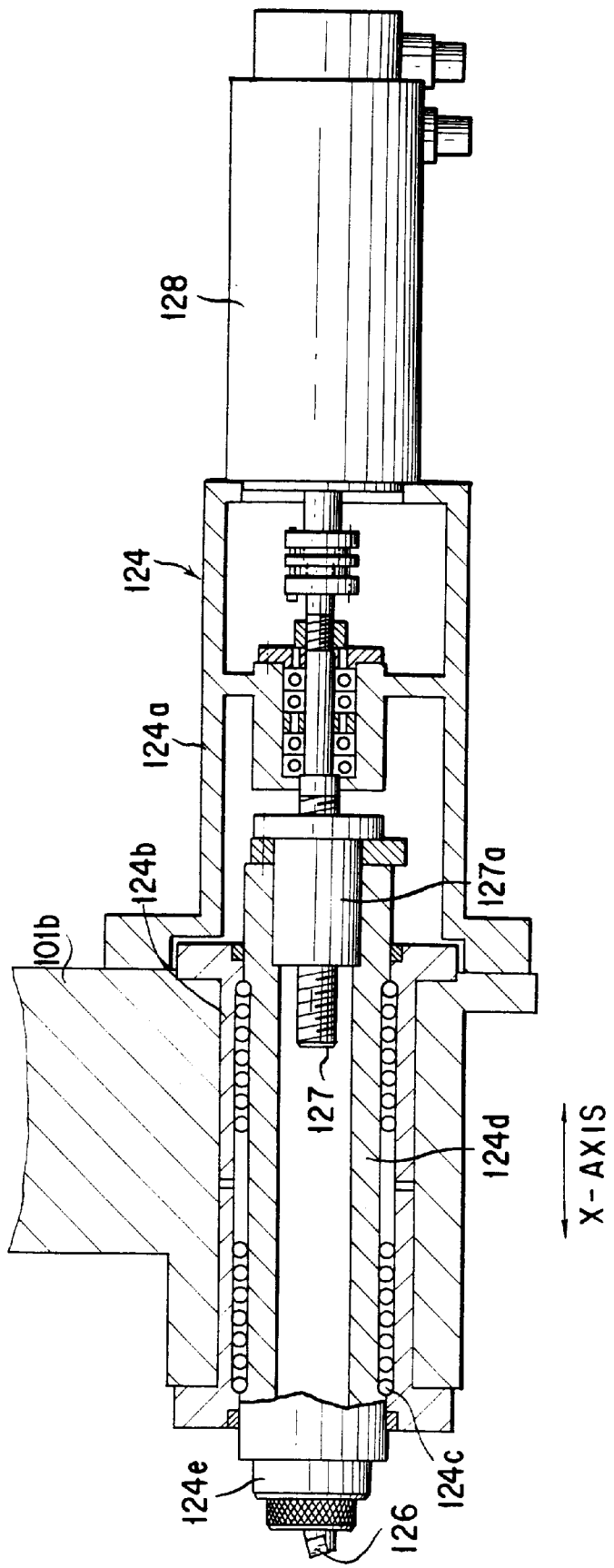
FIG. 15 is a cross sectional view showing a cross sectional view an exterior machining apparatus included in the machining apparatus shown in FIGS. 11 to 13.

As shown in FIG. 15, the exterior machining unit 124 has a support member 124a fastened to a rear surface of the column 101b. The support member 124a has one end side at which a guide member 124b in the form of a hollow cylinder is fastened to the column 101b so as to extend horizontally in a direction of X-axis (that is orthogonal to the C-axis). In the guide member 124b, a tool support member 124d is supported via a ball spline 124c so it may be moved along the X-axis.

The tool support member 124c has at its end proximal to the workpiece 16 and removably mounted thereto via a tool mounting member 124e a cutting tool 126 for machining an outside of the workpiece 16. The tool support member 124c has at its opposite end a nut member 127a fastened thereto which is in mesh with one end portion of a threaded shaft 127 that comprises a ball screw.

The threaded shaft 127 has it other end side coupled to the output shaft of an X-axis motor 128 that comprises a servo motor so that the X-axis motor 128 rotating the threaded shaft 127 in one and the other directions (normally and reversely) may move the tool support member 124d that carries the cutting tool 126 towards and away from the workpiece 16.

The interior machining unit 125 for shaping an inside of the workpiece 16 includes, as shown in FIG. 6, a U-axis slide 125a that is carried on a pair of guide rails 131 each comprising a roller type linear guide which is laid on a vertical surface of the column 101b to extend in a direction of the U-axis parallel to the X-axis.

The left hand side of the U-axis slide 125a is sealed with a roof cover 125c to ease removal of chips from a cutting zone. To drive the U-axis slide 125a along the U-axis, a U-axis motor 132 comprising a linear servo motor is provided as mounted between the U-axis slide 125a and the vertical surface of the column 101b.

The U-axis slide 125a has its forward end reaching a point rightwards of the right hand side spindle 111a, at which is fastened thereto the lower end of a balling bar 25b as mounted substantially horizontally thereto.

As shown in FIG. 14, the balling bar 125b has a forward end portion that past the inside of the right hand side spindle 111a reaches the inside of the workpiece 16, and has its forward end at which a cutting tool 133 for machining an interior of the workpiece 16 is detachably mounted thereto.

Figure 16:
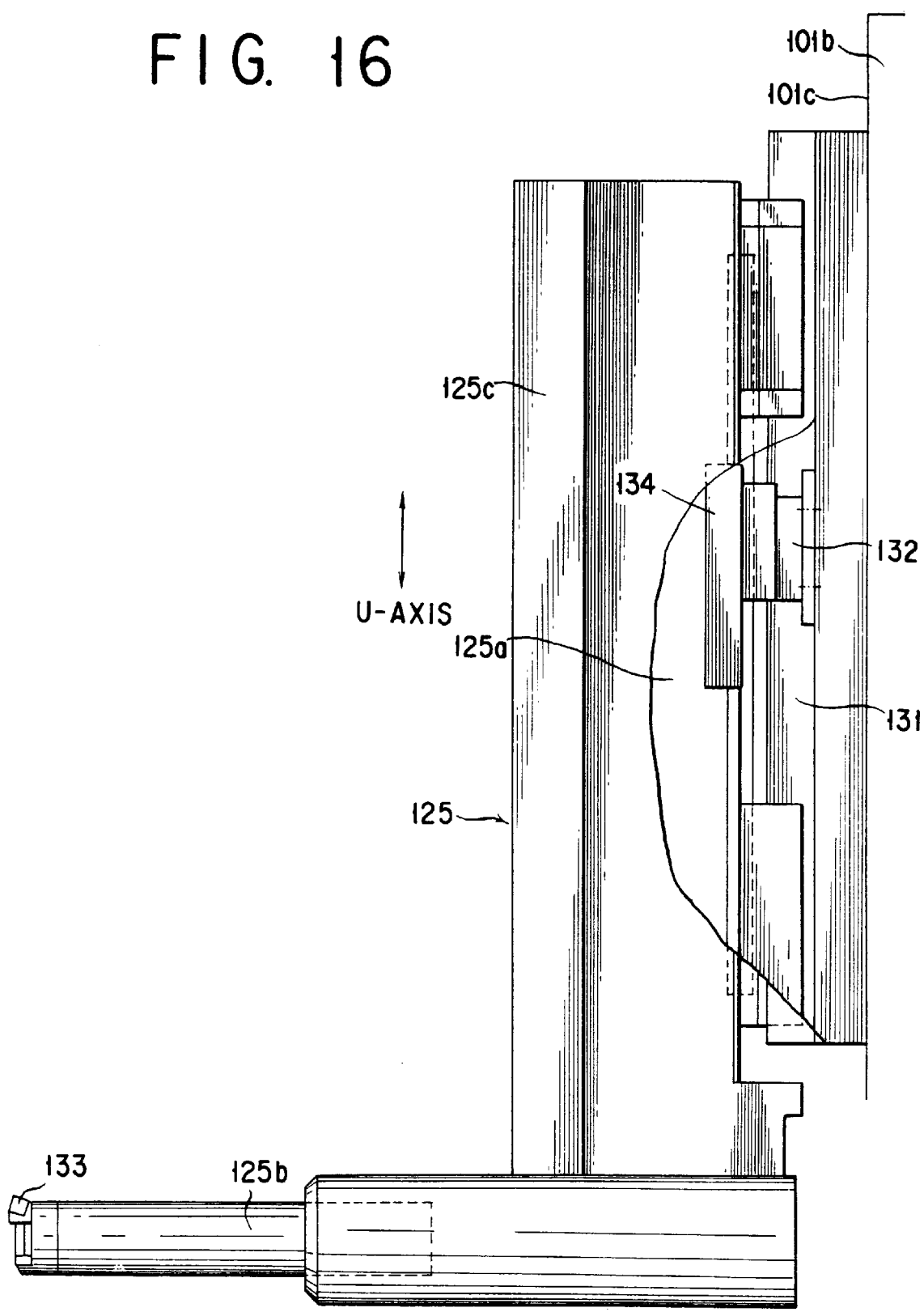
FIG. 16 is a side view in part broken of an inner machining means included in the machining apparatus shown in FIG. 11 to 13.

As shown in FIG. 16, the apparatus is also provided with a slide detector 134 that may comprise a linear scale for detecting the position of the U-axis slide 125a moving along the U-axis. The detector means 134 is constructed and arranged to furnish a signal into an NC unit 135 that is designed to control the Z-axis motor 104, the C-axis motor 119, the U-axis motor 132 and so forth.

In FIG. 1, the machining apparatus is shown also to include a chip conveyer 136 that is designed to carry out chips produced while the workpiece 16 is being machined and to cast them into a chip box 137 placed in the vicinity of the machining apparatus 1.

An explanation will now be given of an operation for machining a workpiece 16 destined to provide, e. g., piston rings, with the apparatus constructed as so far described.

Further, in order for both inside and outside of the workpiece 16 that is being rotated by the C-axis motor 119 to be simultaneously machined, the X-axis, U-axis and Z-axis motors 128, 132 and 104 must be operated synchronously with the C-axis motor 119 under NC by the NC unit 135, and to this end, a standard cycle control makes it time-consuming to process movement data and therefore is inadequate to adopt.

Accordingly, the second embodiment of the invention described is designed to adopt either a rapid cycle control or a DNC mode in operating the NC unit 135 for a machining purpose as described.

When a rapid cycle control mode is adopted in operating the NC unit 135, data converted for a movement to be effected per unit processing time for each axis, a number of its cycles of repetition and so forth are registered in the data area and the header prepared for this control mode in the NC unit 135 to permit the latter to be operated in this mode under a main program for machining.

In initiating a machining operation, a plurality of piston ring blanks are stackes in phase to form a hollow cylindrical workpiece 16. The workpiece 16 is then clamped with a pair of hand carrier jigs not shown from the left and right hand sides and, as it is held so, is carried into the machining apparatus 1 so as to be set between the clamp heads 110f and 111f provided on the left hand side and right hand side spindles 110a and 111a, respectively.

With the workpiece 16 so set, the pressure chamber 112b in the hydraulic cylinder 112 is supplied with pressure fluid to move rightwards both the piston 112a and the left hand side spindle 110a and thereby to firmly clamp, between the clamp head 110f on the left hand side spindle 110a and the clamp head 111a on the right hand side spindle 111a, the workpiece 16 with its longitudinal axis held coincident with the common axis of the left hand side and right hand side spindles 110a and 111a.

The workpiece 16 is phase-indexed in that state. Then, the C-axis motor 119 is driven to cause the C-axis drive means 118 to rotate the left hand side and right hand side spindles 110a and 111a synchronously, thereby driving the workpiece 16 into rotation. The U-axis motor 132 is driven to move the U-axis slide 125 along the U-axis and to advance the cutting tool 133 in the interior machining unit 125 to a position where the workpiece 16 is to commence to be machined on its inner surface from one of its end sides.

The cutting tool 126 in the exterior machining unit 124 has then been retracted to a stand-by position where it does not interfere with the right hand side workpiece support means 111. It should thus be immediately before the cutting tool 133 in the interior machining unit 125 becomes ready to start machining the inner surface of the workpiece 16 that the X-axis motor 128 is driven into rotation to advance the tool support means 124e towards the workpiece 16 and to advance the cutting tool 126 mounted on the tool support means 124e to a position where the workpiece 16 is to commence to be machined on its outer surface from one of its end sides. In this manner, the cutting tool 133 in the interior machining unit 125 and the cutting tool 126 in the exterior machining unit 124 are operated to start and continue to machine both the inner and outer surfaces of the workpiece 16 simultaneously.

Here, in order to impart to the hollow cylindrical workpiece 16 outer and inner sculptured surfaces or contours given that vary in curvature or geometry, the X-axis and the U-axis motors 128 and 132 are operated independently of each other and in synchronism with the C-axis workpiece rotation under NC to so machine the workpiece 16 simultaneously both outside and inside. And, as machining proceeds, the Z-axis motor 104 is controllably driven to so move the Z-axis slide 103 in the direction of Z-axis (leftwards and rightwards) to permit the workpiece 16 to be machined both inside and outside over its given entire length. In the course of machining, it should be noted that those chips produced and emitted from the inside of the workpiece 16 are allowed to fall on the chip conveyer 136 which carries out and cast them into the chip box 137.

After the workpiece 16 has been machined, the U-axis motor 128 is driven to move the tool support member 124e back to its stand-by position and the U-axis motor 132 is then driven to move the U-axis slide 125a back to its original position. And, the X-axis motor 104 is driven to move the Z-axis slide 103 back to its original position. Thereafter, discharging a pressure fluid from the pressure chamber 112b in the hydraulic cylinder 112, permitting the left hand side spindle 110a to move leftwards under the action of the compression spring 110a unclamps the workpiece 16.

After the workpiece 16 is so unclamped, the hand carrier jig is used to clamp the workpiece 16 from the left and right hand sides and to carry it out from the space between the clamp heads 110f and 111f. For a new workpiece, the operation described may be repeated.

It should be noted that while in the first and second embodiments of the invention described, the electric motors are used as the X-axis motors 29 and 128 to move back and forth the cutting tool 126 in the exterior machining unit 124, they may each be replaced by an actuator such as a servo cylinder.

Also, while the operation of the machining apparatus has been described with respect to a workpiece as comprising a laminated blank of piston rings, it suffices to say that in the first and second embodiments described the workpiece need not to be limited so and may be such a blank of cams or a piston blank or any workpiece in general such as to yield a product with curved surfaces that are non-circular in section.

While the present invention has hereinbefore been set forth with respect to a certain illustrative embodiment thereof, it will readily be appreciated by a person skilled in the art to be obvious that many alterations thereof, omissions therefrom and additions thereto can be made without departing from the essence and the scope of the present invention. Accordingly, it should be understood that the invention is not intended to be limited to the specific embodiments thereof set out above, but to include all possible embodiments thereof that can be made within the scope with respect to the features specifically set forth in the appended claims and encompasses all the equivalents thereof.

What is claimed is:

1. An apparatus for machining both inside and outside of a workpiece to impart thereto inner and outer surfaces that are contoured to be non-circular in section, comprising:

workpiece support means including upper and lower workpiece support members for clamping upper and lower end portions of the workpiece oriented substantially vertically, from opposite upper and lower sides of the workpiece to support the workpiece rotatably about an axis of the workpiece support means extending substantially vertically, said workpiece comprising a plurality of piston rings axially stacked and aligned in a phase position;

C-axis drive means for synchronously rotating said upper and lower workpiece support members so as to rotate said workpiece about said axis of said workpiece support means through said upper and lower workpiece support members from both said upper and lower sides of the workpiece;

Z-axis drive means for acting on said workpiece support means to move said workpiece in a direction of said axis of said workpiece support means;

an exterior machining unit having a first cutting tool arranged to be movable in a direction of an x-axis orthogonal to said workpiece axis, said first cutting tool being positionable to lie outside of said workpiece for shaping an outer surface of said workpiece;

an interior machining unit having a second cutting tool arranged to be movable in a direction of a U-axis parallel to said X-axis, said second cutting tool being adapted to be inserted into an inside of said workpiece from an end side of said workpiece for shaping an inner surface of said workpiece; and control means for numerically controlling said C-axis drive means, said exterior machining unit and said interior machining unit so as to independently control movements along said X-axis and said U-axis in synchronism with a rotation about said C-axis.

2. An apparatus as set forth in claim 1 in which said interior machining unit comprises a U-axis slide movable along said U-axis, and a boring bar mounted on an end of said U-axis slide to be oriented substantially vertically and to be inserted into the inside of said workpiece from a lower end side said workpiece.

3. An apparatus as set forth in claim 2, further comprising a linear motor for driving said U-axis slide of said interior machining unit along said U-axis.

4. An apparatus for machining both inside and outside of a workpiece to impart thereto inner and outer surfaces that are contoured to be non-circular in section, comprising:

workpiece support means including left hand and right hand workpiece support members for clamping the workpiece oriented substantially horizontally, from opposite left hand and right hand sides of the workpiece to support the workpiece rotatably about an axis of the support means extending substantially horizontally, said workpiece comprising a plurality of piston rings axially stacked and aligned in a phase position;

C-axis drive means for synchronously rotating said left hand and right hand workpiece support members so as to rotate said workpiece about said axis of said workpiece support means by rotating said workpiece through said left hand and right hand workpiece support members from both said left hand and right hand sides of the workpiece;

Z-axis drive means for acting on said workpiece support means to move said workpiece in a direction of said axis of said workpiece support means;

an exterior machining unit having a first cutting tool arranged to be movable in a direction of an X-axis orthogonal to said workpiece axis, said first cutting tool being positionable to lie outside of said workpiece for shaping an outer surface of said workpiece;

an interior machining unit having a second cutting tool arranged to be movable in a direction of a U-axis parallel to said X-axis, said second cutting tool being adapted to be inserted into an inside of said workpiece from an end side of said workpiece for shaping an inner surface of said workpiece; and control means for numerically controlling said C-axis drive means, said exterior machining unit and said interior machining unit so as to independently control movements along said X-axis and said U-axis in synchronism with a rotation about said C-axis.

5. An apparatus as set forth in claim 4, further comprising a Z-axis slide supporting said workpiece support means and being movable by said Z-axis drive means along said Z-axis, and a support surface supporting said Z-axis slide and being inclined towards the exterior machining unit.

6. An apparatus as set forth in claim 4 in which said interior machining unit comprises a U-axis slide movable along said U-axis, and a boring bar mounted on an end of said U-axis slide to be oriented substantially vertically and to be inserted into the inside of said workpiece from a lower end side of said workpiece.

7. An apparatus as set forth in claim 6, further comprising a linear motor for driving said U-axis slide of said interior machining unit along said U-axis.

* * * * *